Dec. 11, 1945.  J. W. ISEMAN  2,390,651
ROTARY BURNISHING TOOL
Filed June 28, 1944

INVENTOR
JOHN W. ISEMAN.
BY
Ely & Pattison
ATTORNEYS

Patented Dec. 11, 1945

2,390,651

UNITED STATES PATENT OFFICE 2,390,651

ROTARY BURNISHING TOOL

John W. Iseman, New York, N. Y., assignor of one-half to Luis De Urzaiz, New York, N. Y.

Application June 28, 1944, Serial No. 542,590

7 Claims. (Cl. 29—90)

This invention relates to improvements in burnishing tools and more specifically to a burnishing tool for producing an annular burnished area upon a conical bearing surface.

The primary object of the invention is to provide a new and novel burnishing tool, the use of which will increase the operating life of shaft pivots, pintles, or other like rotatable elements having conical bearing surfaces. The conical bearing surfaces of such rotatable elements, when in use, have annular areas thereof in constant engagement with single rows of ball bearings, and it is the purpose of this burnishing tool to burnish such areas by the use of hardened steel balls and impart thereto a homogeneous bearing surface of increased density which is superposed upon the previously lapped bearing surface to produce a finished bearing surface analogous to that of the hardened steel balls.

Whereas a rotary burnishing tool constructed in accordance with my invention is adaptable for use upon various types of shafts having a conical bearing end, I find that it is most useful in producing an annular burnished area upon the conical bearing surface of rotor shaft pivots of gyroscopic instruments used in aircraft. In my tool I employ as a burnishing element, a cluster of hardened steel balls which are identical to those used in the bearings upon which the gyro shaft pivot rotates. In normal operation, gyro shaft pivots rotate on single row ball bearings at speeds from 12,000 to 14,000 R. P. M. and are subjected to relatively high eccentric axial loads under flight conditions. The operational life of such gyroscopic instruments is determined to a great extent by the sustained uniformity of the ball paths of these pivots, which in manufacture are ground and lapped to a finish with extreme care. However, under flight conditions these bearing surfaces are subjected to factors which result in changes from their original identity, which in turn terminates the life of the instrument. By the use of my burnishing tool the life of instruments may be greatly lengthened, for I impart to the bearing areas of the rotor shaft pivots thereof, a homogeneous surface of increased density which is analogous to the ball bearings which said surfaces engage when the shaft pivot is in use.

Another feature of the invention resides in a rotary burnishing tool in which the working tension of the burnishing balls may be regulated in accordance with the nature of the work to be burnished.

A further feature of the invention is the provision of a rotary burnishing tool in which the length of the area to be burnished may be accurately regulated.

Other novel features of the invention will become apparent as the following specification is read in conjunction with the accompanying drawing in which, Figure 1 is a side elevational view of my improved burnishing tool having its tail end mounted in the chuck of a conventional drill press, and its head end in operating engagement with a piece of work.

Figure 1:
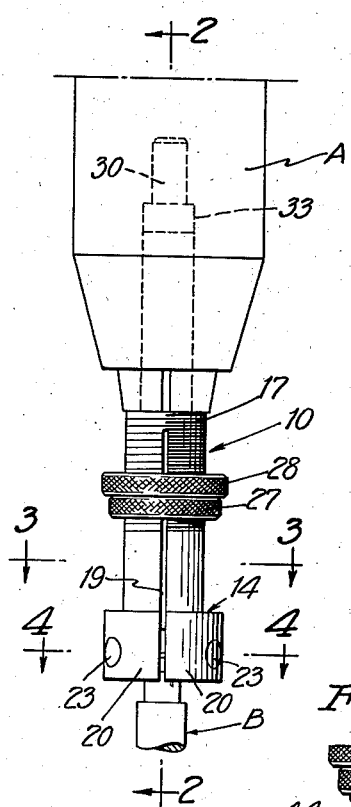

Referring to the drawing by reference characters, the numeral 10 designates my rotary burnishing tool in its entirety which includes a tubular body 11 preferably constructed of tool steel. The body 11 is provided with an axial bore 12 of substantially uniform diameter extending the length thereof. The body 11 is formed to provide a cylindrical intermediate portion 13, an enlarged cylindrical head 14 at the working end thereof, and a reduced cylindrical tail portion 15 at the other end thereof. The bore 12 of the tail portion 15 is screw threaded as at 16. The exterior of the intermediate portion 13 is provided with screw threads 17 for a distance outwardly from the shoulder 18 disposed between the intermediate portion 13 and the reduced tail portion 15.

The body 11 is split inwardly from the head 14 to a point just short of the shoulder 18. There are three radial slots 19 formed by the slitting of the body, the same being equidistantly spaced to divide the head 14 and intermediate portion 13 into three like resilient segmental sections 20. Each segmental section 20 of the head 14 is provided with a hole 21, the axis of which is disposed at right angle to the axis of the bore 12, thus the holes 21 in the sections 20 extend radially from the axis of the bore and all of said holes communicate therewith. Freely disposed in each hole 21 is a spherical burnishing element in the form of a steel ball bearing 22 backed up by a ball bearing cup 23 which snugly fits into the hole with its outer end flush with the periphery of the head 14. Each cup has a hole 24 which registered with alined holes 25—25 in the head through which a cup retaining pin 26 extends. Normally, the uniform resilient tension of the segmental sections 20 acts to contract the head and cause the balls 22 to abut each other at points equidistantly from the axis of the bore 12. The balls 22 which constitute the burnishing elements are of hardened steel identical with those used in the bearings in which the shaft pivot or other piece of work operated upon by the tool 10 is adapted to be mounted.

A tensioning knurled nut 27 is threaded upon the threaded portion 17 and by turning the same to move it toward the head 14 will increase the contracting tension upon the portions 20 of the head, which increased tension is imparted to the cluster of burnishing balls 22. The contracting tension will be reduced as the nut 27 is turned in the direction of the shoulder 18. After the nut has been set for a predetermined tension, the nut is held against accidental turning by a knurled stop nut 28 which is also threaded to the threaded portion 17.

The walls of the work entrance to the bore 12 at the head end are bevelled or flared outwardly as at 29 to expose the working surface of the balls to the work when inserted therein.

Threaded into the bore 12 through the tail end of the body 11 is a stop screw 30, the same having threading engagement with the threaded portion 16 of the bore 12. The inner end of the screw 30 is provided with a reduced axial stop portion 31 which normally terminates in the head 14 adjacent the cluster of balls 22. The outer end of the screw 30 extends beyond the tail portion 15 and has a kerf 32 for the reception of a screw driver to facilitate the turning of the screw to an adjusted stop position. A stop nut 33 is threaded to the outer end of the screw and after an adjustment of the same has been effected, the stop nut is turned into jamming engagement with the free end of the tail portion 15 to hold the screw in its set adjusted position.

Figure 2:
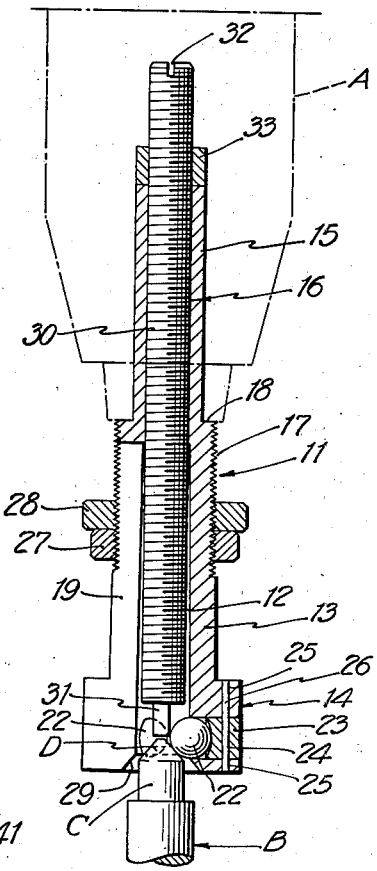
Figure 2 is an enlarged vertical sectional view on the line 2—2 of Figure 1, the chuck being illustrated in dot and dash lines.

In Figures 1 and 2 of the drawing, I have illustrated the rotary burnishing tool 10 as having its tail end fitting into and secured to the rotary chuck A of a conventional drill press. The piece of work B to be burnished by the tool 10 is illustrated as a rotor shaft pivot of a gyroscopic instrument used in aircraft. The rotor shaft pivot B includes a reduced bearing extension C terminating in a conical bearing portion D, an annular area of which is adapted to rotatably engage the hardened steel balls of a ball race bearing when the shaft B is in use. It is such area of the conical bearing portion D which is burnished by the burnishing balls 22 of the tool 10 prior to the application of the shaft B to use.

When the tool 10 is operated by a drill press, the shaft B or other piece of work is fixedly mounted in a fixture or jig so that the axis of the shaft B is in alinement with the axis of the bore 12 of the tool 10. The operator by the actuation of the drill press, causes the rotating tool 10 to move downwardly to a position where the conical portion D enters the head end of the bore 12 whereupon the balls 22 engage the same as the tool 10 is forcibly brought downward. The conical portion D will wedge the balls 22 and head 23 to an expanded position against the contracting tension of the segmental sections 20. When the end of the conical portion D abuts the stop portion 31 of the screw 30, further movement of the tool relative to the shaft B is arrested and the balls have now reached the circumferential area of the conical bearing portion D to be burnished. The drill press is reciprocated for the desired period necessary to burnish the area of the bearing surface inwardly from the end of the portion D of shaft B to impart thereto a homogeneous surface of increased density which is superimposed upon the previously lapped surface to produce a finished bearing surface analogous to that of the hard steel balls 22. As the tool 10 is withdrawn from engagement with the shaft B, the contracting tension of the resilient sections 20 will cause the balls to move inwardly toward each other and assume a position of rest in which they contact each other. The contracting tension imparted indirectly to the burnishing balls may be regulated by the adjustment of the nut 27 along the length of the threaded portion 17. Also, the distance of insertion of the work into the burnishing head may be regulated by the adjustment of the stop screw 30. The tension adjustment and work stop adjustment are desirous to adapt the tool to the different materials of which the work is constructed and the circumferential area to be burnished.

Figure 5:
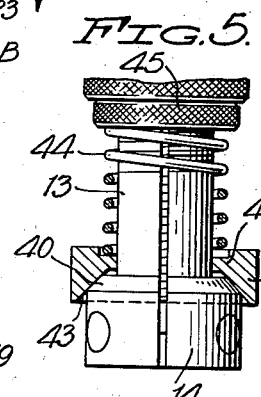
Figure 5 is a detail sectional elevational view of a modified form of spring tensioning means for the burnishing head.
Figure 3:
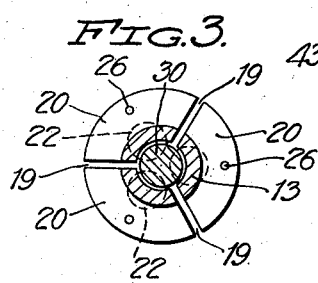
Figure 3 is an enlarged horizontal sectional view on the line 3—3 of Figure 1.
Figure 4:
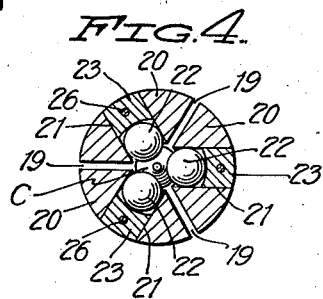
Figure 4 is an enlarged horizontal sectional view on the line 4—4 of Figure 1.

In Figure 5 of the drawing I have illustrated a modified form of contracting tensioning means for the head 14. In lieu of the nuts 27 and 28, I bevel the top corner edge of the head 12 as at 40. Slidably mounted on the portion 13 of the body 11 is an inverted cup-shaped member 41 having its annular wall 42 provided with an inner annular bevel surface 43 which is complementary to the bevel surface 40 of the head 14. A helical expansion spring 44 surrounds the portion 13 and has one of its ends seated against the member 41 and its other end seated against an adjusting nut 45 threaded to the threaded portion 17. The spring 44 acting upon the member 41 causes the coacting bevelled surfaces 43 and 40 to impart a contraction of the split head 14. The amount of contracting tension may be adjusted by the manipulation of the nut 45.

In the foregoing description, I have referred to the rotary burnishing tool 10 as being operated in a drill press, but I do not limit the same to use in such a machine for it may also function in a lapping machine, lathe, or other machine having a rotary chuck.

While I have shown and described what I consider to be the preferred embodiments of my invention, I wish it to be understood that such changes in construction, design, and materials as come within the scope of the appended claims may be resorted to if desired without departing from the spirit of my invention.

Having thus described the invention, what I claim as new and desire to secure by Letters Patent of the United States is:

1. A rotary burnishing tool comprising in combination, a tubular body having a head end, a group of like spherical burnishing elements mounted in the head end of said body in concentric relation to the axis thereof, like tension means urging the burnishing elements toward the axis of said body, whereby the conical end of a piece of work may be inserted axially into the head end of said body for engagement with the burnishing elements, and a stop member threaded in said tubular body having its inner end disposed adjacent the group of spherical burnishing elements for regulating the distance of insertion of the work into the head end of the tool.

2. A rotary burnishing tool comprising in combination, a tubular body having a working head at one end thereof, a cluster of like spherical burnishing elements freely mounted in the working head in concentric relation to the axis of said body, resilient means acting to urge the spherical burnishing elements toward the axis of the body, means for adjusting the tension of the resilient means, whereby the conical end of a piece of work may be forcibly inserted axially into the head for burnishing engagement with the burnishing elements, and a stop screw threaded in the tubular body having one of its ends terminating inwardly of and adjacent the cluster of spherical burnishing elements for limiting the insertion of a piece of work to be burnished into the head of the tool relative to said burnishing elements.

3. A rotary burnishing tool comprising a body having a bore extending therethrough, said body comprising an externally screw threaded intermediate portion, a reduced tail end portion, and an enlarged head end portion, said head end portion and intermediate portion being slit inwardly from the free end of the head portion to provide resilient segmental sections, a spherical burnishing element mounted in the head end of each segmental section in obstructing relation to the bore, means for imparting a uniform contracting tension upon the spherical burnishing elements through their respective resilient segmental members, and means for regulating the tension imparted by the aforesaid means.

4. A rotary burnishing tool as set forth in claim 3 in which the means for regulating the tension imparted to the first means comprises an externally screw threaded portion provided on the split intermediate portion of the body, and a nut threaded to said screw threaded portion.

5. A rotary burnishing tool as set forth in claim 3 in which the means for regulating the tension imparted to the first means comprises an annular bevel provided on the top edge of the head end portion, a wedge member slidably mounted on the intermediate portion of the body having an annular bevelled surface complementary to the annular bevel and in wedging engagement therewith, and adjustable spring means acting upon the wedge member to forcibly urge the same into wedging engagement with the head end portion.

6. A rotary burnishing tool comprising an elongated body having a bore extending therethrough and a head portion at one end thereof, said body being provided with radial slits extending inwardly from the head portion to provide a plurality of resilient segmental sections, a spherical metal burnishing element mounted in the head portion of each segmental section in normal obstructing relation to said bore, and means for imparting a uniform contracting tension upon the respective resilient segmental members to correspondingly impart a contraction of the spherical burnishing elements carried thereby.

7. A rotary burnishing tool as set forth in claim 6 including, a stop member threaded in the bore of the elongated body with its inner end disposed adjacent the burnishing elements in the path of insertion of a piece of work into the head end, the outer end of said stop member extending beyond the other end of the body, and a jam-nut threaded to the outer end of the stop member and tightly abutting the adjacent end of the body for securing the stop member in an adjusted position relative to the spherical burnishing elements.

JOHN W. ISEMAN.